(12) United States Patent
Wu

(10) Patent No.: US 9,256,095 B2
(45) Date of Patent: Feb. 9, 2016

(54) LIQUID CRYSTAL DISPLAY MODULE

(71) Applicant: TIANJIN FUNAYUANCHUANG TECHNOLOGY CO.,LTD., Tianjin (CN)

(72) Inventor: Ho-Chien Wu, Hsinchu (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 326 days.

(21) Appl. No.: 13/837,359

(22) Filed: Mar. 15, 2013

(65) Prior Publication Data

US 2014/0022496 A1     Jan. 23, 2014

(30) Foreign Application Priority Data

Jul. 23, 2012  (CN) .......................... 2012 1 0256834

(51) Int. Cl.
*G02F 1/1335* (2006.01)
*G02F 1/1333* (2006.01)
*B82B 1/00* (2006.01)

(52) U.S. Cl.
CPC ............... *G02F 1/13338* (2013.01); *B82B 1/00* (2013.01); *Y10S 977/742* (2013.01)

(58) Field of Classification Search
CPC .................................................. G02F 1/13338
See application file for complete search history.

(56) References Cited

U.S. PATENT DOCUMENTS

| 8,982,461 | B2 * | 3/2015 | Wu | .......................... 359/483.01 |
| 9,057,904 | B2 * | 6/2015 | Wu | |
| 2004/0075779 | A1 * | 4/2004 | Paukshto et al. | ................. 349/12 |
| 2008/0143906 | A1 * | 6/2008 | Allemand et al. | ............... 349/43 |
| 2009/0051863 | A1 * | 2/2009 | Meisner | ........................ 349/143 |
| 2009/0085894 | A1 * | 4/2009 | Gandhi et al. | ................. 345/175 |
| 2010/0097344 | A1 | 4/2010 | Verweg | |
| 2010/0231549 | A1 | 9/2010 | Chien et al. | |
| 2010/0271316 | A1 | 10/2010 | Huang et al. | |
| 2010/0315374 | A1 * | 12/2010 | Chen et al. | ..................... 345/174 |
| 2011/0281068 | A1 * | 11/2011 | David et al. | .................... 428/141 |
| 2011/0285941 | A1 * | 11/2011 | Liu et al. | .......................... 349/96 |
| 2011/0299015 | A1 * | 12/2011 | Liu et al. | .......................... 349/96 |
| 2011/0304579 | A1 | 12/2011 | Feng et al. | |
| 2011/0304785 | A1 * | 12/2011 | Ge et al. | ........................... 349/33 |
| 2012/0147472 | A1 * | 6/2012 | Kajiya et al. | .................. 359/601 |
| 2012/0218198 | A1 * | 8/2012 | Shin et al. | ..................... 345/173 |

(Continued)

FOREIGN PATENT DOCUMENTS

| CN | 101458410 | 6/2009 |
| CN | 101859216 | 10/2010 |

(Continued)

*Primary Examiner* — Timothy L Rude
(74) *Attorney, Agent, or Firm* — Novak Druce Connolly Bove + Quigg LLP

(57) ABSTRACT

A liquid crystal display module includes a liquid crystal module and a polarizer on the liquid crystal module. The liquid crystal module includes an upper substrate, an upper electrode layer, a first alignment, a liquid crystal layer, a second alignment layer, a thin film transistor panel, and a lower polarizing layer. The polarizer includes a first transparent conductive layer, an upper polarizing layer, and a second transparent conductive layer on the second surface of the upper polarizing layer stacked together. A number of first electrodes are electrically connected with the first transparent conducive layer, a number of second electrodes are electrically connected with the second transparent conducive layer. The first transparent conductive layer includes a number of transparent conductive belts along a second direction, and the second transparent conductive layer includes a number of carbon nanotubes substantially aligned along a first direction.

13 Claims, 21 Drawing Sheets

(56) References Cited

U.S. PATENT DOCUMENTS

| | | | |
|---|---|---|---|
| 2013/0222317 A1* | 8/2013 | Abiru et al. | 345/173 |
| 2014/0022465 A1* | 1/2014 | Wu | 349/12 |
| 2014/0024155 A1* | 1/2014 | Wu | 438/30 |
| 2014/0024280 A1* | 1/2014 | Wu | 445/24 |

FOREIGN PATENT DOCUMENTS

| | | |
|---|---|---|
| TW | M317033 | 8/2007 |
| TW | 201017264 | 5/2010 |
| TW | 201033880 | 9/2010 |
| TW | 201038997 | 11/2010 |
| TW | I332594 | 11/2010 |
| TW | 098134306 | 4/2011 |
| TW | 201131452 | 9/2011 |
| TW | 201200937 | 1/2012 |
| TW | 201222349 | 6/2012 |
| TW | 201229579 | 7/2012 |

* cited by examiner

LIQUID CRYSTAL DISPLAY MODULE

CROSS-REFERENCE TO RELATED APPLICATIONS

This application claims all benefits accruing under 35 U.S.C. §119 from China Patent Application No. 201210256834.X, filed on Jul. 23, 2012, in the China Intellectual Property Office, the disclosure of which is incorporated herein by reference. The application is also related to copending application Ser. No. 13/837,266 entitled, "LIQUID CRYSTAL DISPLAY MODULE," filed Mar. 15, 2013.

BACKGROUND

1. Technical Field

The present disclosure relates to liquid crystal display module, particularly to a liquid crystal display module with touch sensing capability.

2. Description of Related Art

A conventional liquid crystal display module for a liquid crystal display (LCD), according to the prior art, generally includes a first polarizer, a thin film transistor panel, a first alignment layer, a liquid crystal layer, a second alignment layer, a common electrode layer (e.g., an indium tin oxide (ITO) layer), an upper board, and a second polarizer. The TFT panel includes a plurality of pixel electrodes. The polarizing directions of the first and second polarizer are perpendicular to each other. When a voltage is applied between the pixel electrode and the common electrode layer, the liquid crystal molecules in the liquid crystal layer between the first alignment layer and the second alignment layer align along a same direction to make the light beams polarized by the first polarizer irradiate on the second polarizer directly without rotation. The polarized light beams cannot pass through the first polarizer. Without a voltage applied to the pixel electrode and the common electrode layer, the polarized light beams rotated by the liquid crystal molecules can pass through the second polarizer. Selectively applying voltages between different pixel electrodes and the common electrode layer can control the on and off of different pixels, thus displaying images.

A conventional polarizing layer is made by using a transparent polymer film (e.g., PVA film) to absorb the dichroism material, and the dichroism material. The dichroism material is infiltrated into the transparent polymer film, and the transparent polymer film align with the dichroism material in one direction. In addition to the polarizing layer, the conventional polarizer also includes protective layers, adhesive layer, separating layer covered on two opposite surfaces of the polarizing layer. During the manufacturing of the liquid crystal display screen, the second polarizer is directly attached to a top surface of the upper board.

In recent years, there is continuous growth in the number of electronic apparatuses equipped with optically transparent touch panels in front of their respective display devices (e.g., liquid crystal display screen). The touch panel is commonly attached to the top surface of the second polarizer. However, this arrangement will increase a thickness of the electronic apparatuses. Further, the touch panel and the second polarizer are individually manufactured and assembled, which increases the complexity of the manufacturing process, and increases the cost for production.

What is needed, therefore, is to provide a LCD module for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
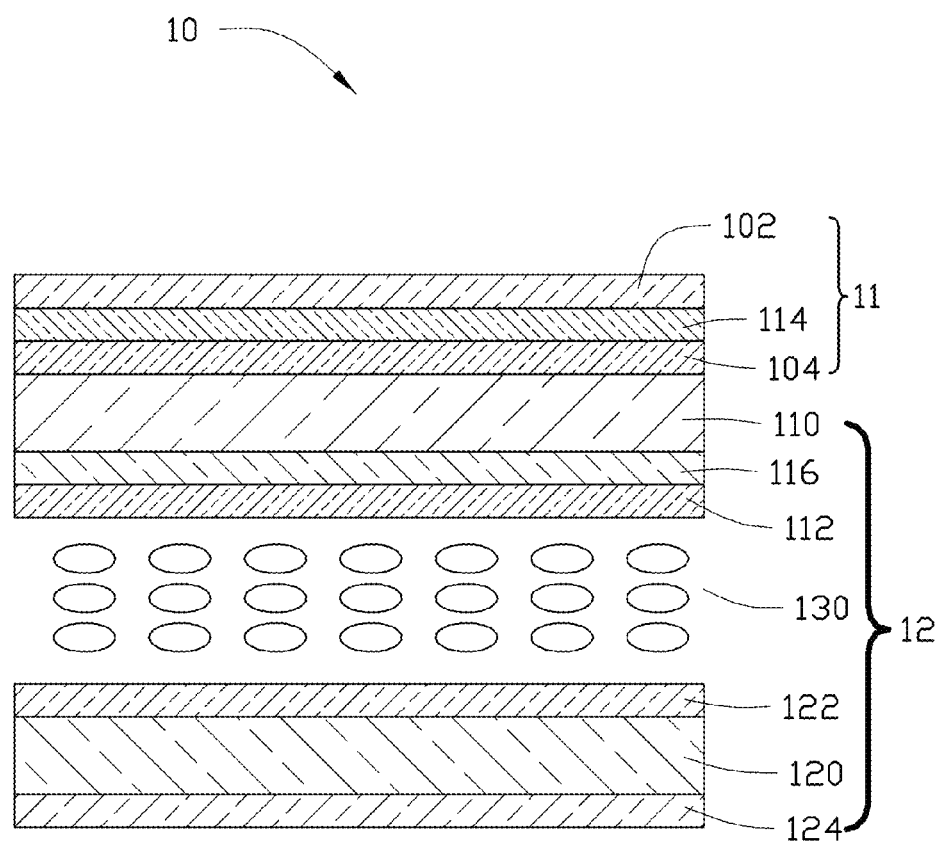
FIG. 1 is a schematic cross-sectional view of an embodiment of a LCD module.
Figure 2:
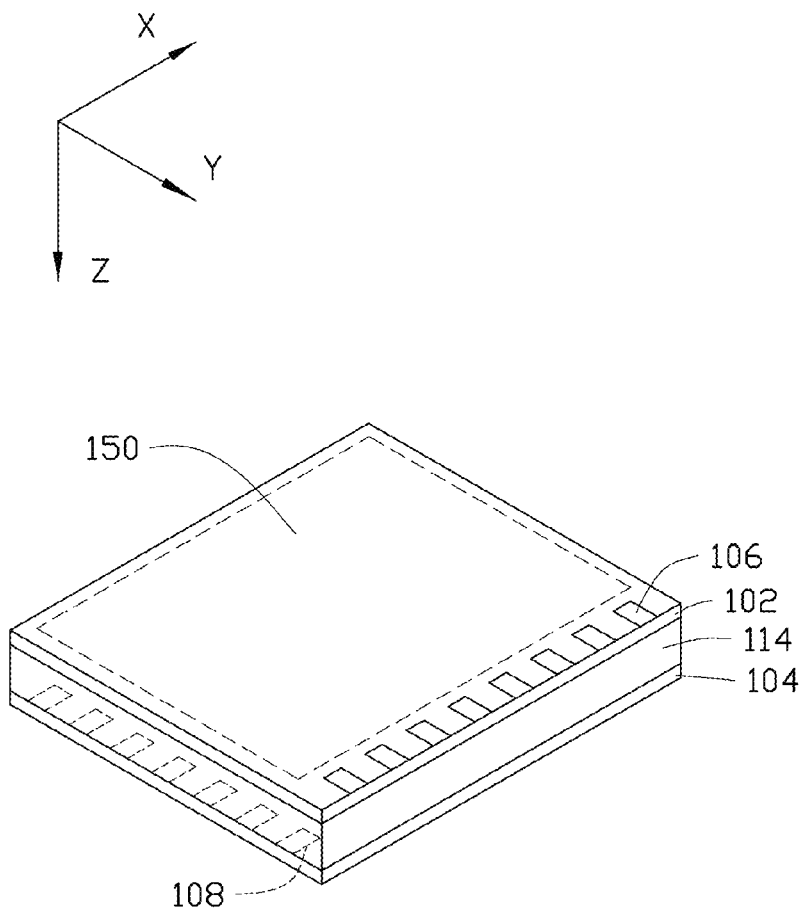
FIG. 2 is a schematic view of an embodiment of a polarizer in the LCD module of FIG. 1.

Referring to FIG. 1 and FIG. 2, one embodiment of a liquid crystal display (LCD) module 10 includes a polarizer 11 and a liquid crystal module 12. The polarizer 11 is capable of sensing touches, occurred thereon, and polarizing light.

The polarizer 11 includes a first transparent conductive layer 102, an upper polarizing layer 114, and a second transparent conductive layer 104. The polarizer 11 is stacked on the liquid crystal module 12. The upper polarizing layer 114 is sandwiched between the first transparent conductive layer 102 and the second transparent conductive layer 104. The polarizer 11 further includes a plurality of first electrodes 106 and a plurality of second electrodes 108. The plurality of first electrodes 106 are spaced from each other and electrically connected to the first transparent conductive layer 102. The plurality of second electrodes 108 are spaced with each other and electrically connected to the second transparent conductive layer 104. The polarizer 11 is suitable for a touch sensing type LCD screen.

The upper polarizing layer 114 can be an insulating material layer having a light polarizing function. Specifically, the upper polarizing layer 114 includes a transparent polymer film (e.g., PVA film) and a dichroism material infiltrated in the transparent polymer film. The dichroism material can be iodoquinine sulfate. The molecules of the dichroism material can align along the same direction.

The polarizing layer 114 includes a first surface away from the liquid crystal module 12, and a second surface adjacent to the liquid crystal module 12. The first transparent conductive layer 102 can be directly in contact with the first surface of the polarizing layer 114. The first transparent conductive layer 102 can be an anisotropic impedance layer. In the present disclosure, the anisotropic impedance means a structure having a relatively low impedance direction D and a relatively high impedance direction H on the same surface (e.g., the surface of the first transparent conductive layer 102). The electrical conductivity of the anisotropic impedance layer on the relatively high impedance direction H is smaller than the electrical conductivities of the anisotropic impedance layer on other directions. The electrical conductivity of the anisotropic impedance layer on the relatively low impedance direction D is larger than the electrical conductivities of the anisotropic impedance layer in other directions. The relatively high impedance direction H is different from the relatively low impedance direction D. In one embodiment, the relatively high impedance direction H is perpendicular to the relatively low impedance direction D. The relatively high impedance direction H and the relatively low impedance direction D of the anisotropic impedance layer can be achieved by having a plurality of conductive belts having a low conductivity aligned along the relatively high impedance direction H and a plurality of conductive belts having a high conductivity aligned along the relatively low impedance direction D, and the plurality of conductive belts having the low conductivity and the plurality of conductive belts having the low conductivity are electrically connected with each other. In another embodiment, the relatively high impedance direction H and the relatively low impedance direction D of the anisotropic impedance layer can be achieved by having a carbon nanotube film comprising orderly arranged carbon nanotubes. The first transparent conductive layer 102 can have a square shape having two sides perpendicular to the relatively high impedance direction H and two sides perpendicular to the relatively low impedance direction D. The relative low impedance direction D can be defined as a second direction, such as a Y direction shown in FIG. 2. The relative high impedance direction H can be defined as a first direction, such as an X direction shown in FIG. 2. The first direction can be perpendicular with the second direction.

The plurality of first electrodes 106 is spaced with each other and arranged in a row along the first direction. More specifically, the plurality of first electrodes 106 are arranged on a side of the first transparent conductive layer 102. A length along the first direction of each first electrode 106 can be between about 1 mm to about 8 mm. A distance between the two adjacent first electrodes 106 can be between about 3 mm to about 5 mm. A signal input by each first electrode 106 to the first transparent conductive layer 102, or received from the first transparent conductive layer 102, will transmit mostly along the Y direction. The directional characteristic of the signal transmittance in the first transparent conductive layer 102 can be used as a determining basis for the polarizer 11 to determine a touch location. It is to be understood that the size and pitch of the plurality of first electrodes 106 can change depending on the desired resolution and application. The plurality of first electrodes 106 can be located on the surface of the first transparent conductive layer 102, near the side. The first electrodes 106 can be formed by screen printing, sputtering, evaporating, or coating methods.

The second transparent conductive layer 104 can be directly in contact with the second surface of the upper polarizing layer 114. The second transparent conductive layer 104 can also be the anisotropic impedance layer. The relatively high impedance direction H of the second transparent layer 104 is along the Y direction, and the relatively low impedance direction D of the second transparent layer 104 is along the X direction. The second electrodes 108 are electrically connected with the second transparent conductive layer 104. The second electrodes 108 can be disposed on one side of the second transparent conductive layer 104 at unequal intervals. The second electrodes 108 can be formed in a row extending along the Y direction. The first transparent conductive layer 102 overlaps the second transparent conductive layer 104 in a third direction (i.e., a Z direction shown in FIG. 2), defined from the first transparent conductive layer 102 to the second transparent conductive layer 104. The third direction can be substantially perpendicular to the first direction and the second direction. A touch region 150 is formed at the overlapped portions between the first transparent conductive layer 102 and the second transparent conductive layer 104.

In some embodiments, the first transparent conductive layer 102 includes a first carbon nanotube layer, and the second transparent conductive layer 104 includes a second carbon nanotube layer. Both the first carbon nanotube layer and the second carbon nanotube layer include a carbon nanotube film having anisotropic electrical conductivity. Carbon nanotubes of the first carbon nanotube layer can be substantially arranged along the second direction, so that the first carbon nanotube layer has a larger electrical conductivity at the second direction than at other directions. Carbon nanotubes of the second carbon nanotube layer can be substantially arranged along the first direction, so that the second carbon nanotube layer has a larger electrical conductivity at the first direction than at other directions.

In some embodiments, both the first carbon nanotube layer and the second carbon nanotube layer comprise a plurality of carbon nanotubes. In some embodiments, each of the first carbon nanotube layer and the second carbon nanotube layer can be or include at least one carbon nanotube drawn film.

The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction, by Van der Waals attractive force. A small number of the carbon nanotubes may be randomly arranged in the carbon nanotube drawn film, and has a small if not negligible effect on the larger number of the carbon nanotubes in the carbon nanotube drawn film arranged substantially along the same direction. The carbon nanotube drawn film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

Figure 3:
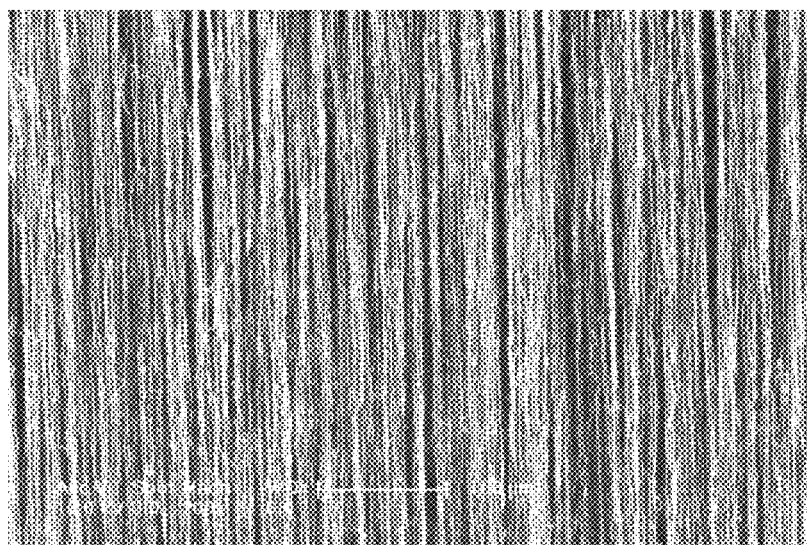
FIG. 3 shows a scanning electron microscope image of a carbon nanotube drawn film.

It can be appreciated that some variation can occur in the orientation of the carbon nanotubes in the carbon nanotube drawn film as can be seen in FIG. 3. Microscopically, the carbon nanotubes oriented substantially along the same direction may not be perfectly aligned in a straight line, and some curved portions may exist. It can be understood that some carbon nanotubes located substantially side by side and oriented along the same direction being contact with each other cannot be excluded.

Figure 4:
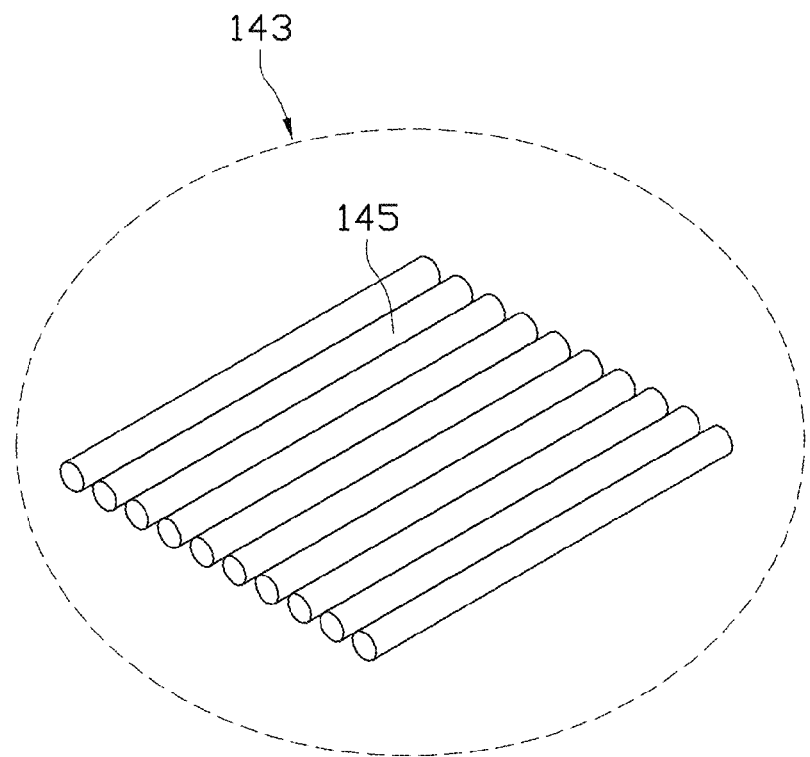
FIG. 4 is a schematic view of a carbon nanotube segment.

More specifically, referring to FIG. 4, the carbon nanotube drawn film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity, and shape. The carbon nanotubes 145 in the carbon nanotube drawn film are also substantially oriented along a preferred orientation.

In one embodiment, the carbon nanotube drawn film can be drawn out from an array of carbon nanotubes. The carbon nanotube drawn film can be formed by selecting one or more carbon nanotubes having a predetermined width from the array of carbon nanotubes, and pulling the carbon nanotubes at a roughly uniform speed to form carbon nanotube segments that are joined end to end to achieve a uniform carbon nanotube drawn film.

The carbon nanotube segments can be selected by using a tool, such as adhesive tape, pliers, tweezers, or other tools allowing multiple carbon nanotubes to be gripped and pulled simultaneously to contact with the array of carbon nanotubes. Referring to FIG. 4, each carbon nanotube segment 143 includes a plurality of carbon nanotubes 145 substantially parallel to each other, and combined by Van der Waals attractive force therebetween. The pulling direction can be substantially perpendicular to the growing direction of the array of carbon nanotubes.

The drawn carbon nanotube film has the smallest resistance at the pulling direction, and the largest resistance at a direction substantially perpendicular to the pulling direction.

In one embodiment, both of the first carbon nanotube layer and the second carbon nanotube layer include a number of carbon nanotube drawn films located side by side or stacked with each other. Carbon nanotubes of the first carbon nanotube layer are arranged substantially along the second direction Y. Carbon nanotubes of the second carbon nanotube layer are arranged substantially along the first direction X. The length and width of the carbon nanotube drawn films are not limited, because the carbon nanotube drawn films can be located side by side or stacked with each other in the first carbon nanotube layer and the second carbon nanotube layer. In one embodiment, each carbon nanotube drawn film has a light transmittance greater than 85%, and the number of layers of the carbon nanotube drawn films is not limited, so long as the first carbon nanotube layer and the second carbon nanotube layer have proper light transmittance.

In some embodiments, each of the first carbon nanotube layer and the second carbon nanotube layer includes a carbon nanotube composite film. The carbon nanotube composite film includes a carbon nanotube drawn film and polymer materials infiltrating the carbon nanotube drawn film. Spaces can exist between adjacent carbon nanotubes in the carbon nanotube drawn film, and thus the carbon nanotube drawn film includes a number of micropores defined by the adjacent carbon nanotubes therein. The polymer material is filled into the micropores of the carbon nanotube drawn film to form the carbon nanotube composite film. The polymer materials can be distributed uniformly in the carbon nanotube composite film. The carbon nanotube composite film can include one or more carbon nanotube drawn films. The carbon nanotube composite film can have a uniform thickness. A thickness of the carbon nanotube composite film is only limited by the degree of transparency desired. In one embodiment, the thickness of the carbon nanotube composite film can range from about 0.5 nanometers to about 100 microns. The polymer material can be transparent, and not limited to a specific material. The polymer material can be polystyrene, polyethylene, polycarbonate, polymethyl methacrylate (PMMA), polycarbonate (PC), polyethylene terephthalate (PET), benzocyclobutene (BCB), or polyalkenamer. In one embodiment, the polymer material is PMMA.

In some embodiments, each of the first carbon nanotube layer and the second carbon nanotube layer includes at least one etched or laser-treated carbon nanotube drawn film. The etched or laser-treated carbon nanotube drawn film has an enhanced anisotropic electrical conductivity. For example, a number of cutting lines along the preferred orientation of the carbon nanotubes can be formed in the first carbon nanotube layer along the second direction through laser or etching.

The first electrodes 106 and the second electrodes 108 can include conductive materials, such as metals, conductive polymer materials, or carbon nanotubes. The metals can be gold, silver, copper or any other metal having a good conductivity. The conductive polymer materials can be polyacetylene, polyparaphenylene, polyaniline, or polythiophene. In one embodiment, the first electrodes 106 and the second electrodes 108 can be made of conductive silver pastes.

Because both of the first transparent conductive layer 102 and the second transparent conductive layer 104 have good anisotropic electrical conductivity, the first transparent conductive layer 102 can be seen as an equivalent of a number of conductive bands, each of which contacting one of the first electrodes 106. Similarly, the second transparent conductive layer 104 can also be seen as an equivalent of a number of conductive bands, each of which contacting one of the second electrodes 108. The conductive bands of the first transparent conductive layer 102 are substantially perpendicular to the conductive bands of the second transparent conductive layer 104. Thus, a number of capacitances are formed at the intersections of the conductive bands of the first transparent conductive layer 102 and the second transparent conductive layer 104. In operation of the LCD module, one or more contacts can be made with the polarizer 11 from one or more contact tools (not shown), such as fingers or a stylus. Capacitances of the contact points will change and can be detected by external circuits connected with the first electrodes 106 and the second electrodes 108. The coordinates of the contact points on the polarizer can be obtained.

The liquid crystal module 12 is located under the second transparent conductive layer 104 of the polarizer 11. The liquid crystal module 12 includes an upper substrate 110, an upper electrode layer 116, a first alignment layer 112, a liquid crystal layer 130, a second alignment layer 122, a thin film transistor panel 120, and a lower polarizing layer 124 stacked together in that order. The upper polarizing layer 114 and the lower polarizing layer 124 act together to control the light extraction intensity.

The upper substrate 110 can be a transparent plate. The upper substrate 110 can be made of glass, quartz, diamond, plastic or resin. The thickness of the upper substrate 110 can range from about 1 millimeter to about 1 centimeter. In one embodiment, the upper substrate 110 is a PET film and the thickness of the upper substrate 110 is about 2 millimeters.

The upper electrode layer 116 can include conductive materials, such as metals, ITO, ATO (tin antimony oxide), conductive polymer materials, or carbon nanotubes. The metals can be gold, silver, copper or any other metal having a good conductivity. The conductive polymer materials can be polyacetylene, polyparaphenylene, polyaniline, or polythiophene. In some embodiments, the upper electrode layer 116 can be a carbon nanotube film. The carbon nanotube film can include a plurality of carbon nanotubes. In one embodiment, the carbon nanotubes of the carbon nanotube film can be disorderly arranged. In one embodiment, the carbon nanotubes of the carbon nanotube film can be orderly arranged.

The first alignment layer 112 can include a number of substantially parallel first grooves (not shown) formed thereon. The first grooves are located on a lower surface of the first alignment layer 112 opposing the liquid crystal layer 130. The first grooves are used to make the liquid crystal molecules align along a same direction. The second alignment layer 122 can include a number of substantially parallel second grooves (not shown) formed thereon. The second grooves are located on an upper surface of the second alignment layer 122 opposing the liquid crystal layer 130.

An alignment direction of the first grooves is substantially perpendicular to an alignment direction of the second grooves. The second grooves are used to make the liquid crystal molecules align substantially along a same direction. Because the alignment direction of the first grooves is substantially perpendicular to the alignment direction of the second grooves, the alignment direction of the liquid crystal molecules differ by about 90 degrees between the first alignment layer 112 and the second alignment layer 122, which play a role in shifting the light beams by 90 degrees.

The material of the first alignment layer 112 and the second alignment layer 122 can be polystyrenes and derivatives of the polystyrenes, polyimides, polyvinyl alcohols, polyesters, epoxy resins, polyurethanes, or other polysilanes. The first grooves and the second grooves can be formed by a rubbing method, a tilt deposition method, a micro-grooves treatment method, or a SiOx-depositing method. In one embodiment, a material of the first alignment layer 112 and the second alignment layer 122 is polyimide and a thickness thereof ranges from about 1 micrometer to about 50 micrometers.

The liquid crystal layer 130 includes a number of oval shaped liquid crystal molecules. Understandably, the liquid crystal layer 130 can also be made of other conventional suitable materials, such as alkyl benzoic acid, alkyl cyclohexyl acid, alkyl cyclohexyl-phenol, and phenyl cyclohexane. A thickness of the liquid crystal layer 130 ranges from about 1 micrometer to about 50 micrometers. In one embodiment, a thickness of the liquid crystal layer 130 is about 5 micrometers.

The detailed structure of the thin film transistor panel 120 is not shown in FIG. 1. It is to be understood that the thin film transistor panel 120 can further include a transparent base, a number of thin film transistors located on the transparent base, a number of pixel electrodes, and a display driver circuit (not shown). The thin film transistors correspond to the pixel electrodes in a one-to-one manner. The thin film transistors are connected to the display driver circuit by the source lines and gate lines. The pixel electrodes are controlled to cooperate with the second transparent conductive layer 104, to apply a voltage to the liquid crystal layer 130. The pixel electrodes correspond to the touch region 150.

The upper polarizing layer 114 functions as an insulating layer in the polarizer 11 to insulate the first transparent conductive layer 102 and the second transparent conductive layer 104. Furthermore, the upper polarizing layer 114 can also cooperate with the lower polarizing layer 124 to control the light extraction intensity of the liquid crystal module 12. Thus the LCD module 10 can have a low thickness, simple structure, and low cost.

Figure 5:
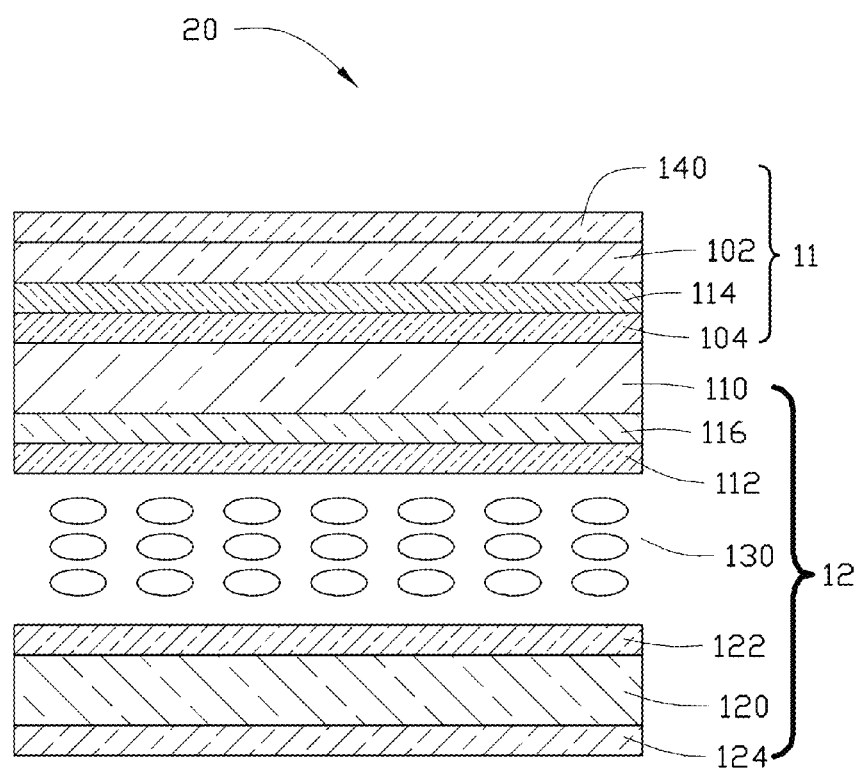
FIG. 5 is a schematic cross-sectional view of one embodiment of a LCD module.
Figure 6:
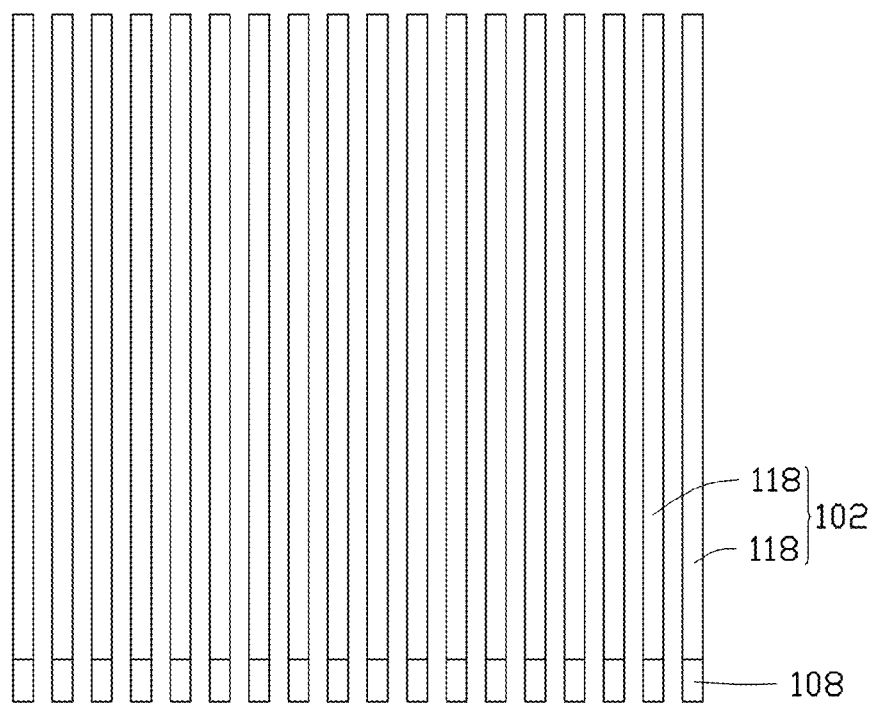
FIG. 6 is a top view of one embodiment of a second transparent conductive layer in the LCD module of FIG. 5.

Referring to FIG. 5 and FIG. 6, another embodiment of a LCD module 20 includes a polarizer 11 and a liquid crystal module 12. The polarizer 11 is capable of sensing touches occurred thereon and polarizing lights. The polarizer 11 includes a first transparent conductive layer 102, a transparent base 140, an upper polarizing layer 114, and a second transparent conductive layer 104 stacked on the liquid crystal module 12. The upper polarizing layer 114 is sandwiched between the transparent base 140 and the second transparent conductive layer 104. The polarizer 11 further includes a plurality of first electrodes 106 and a plurality of second electrodes 108. The plurality of first electrodes 106 are spaced with each other and electrically connected to the first transparent conductive layer 102. The plurality of second electrodes 108 are spaced with each other and electrically connected to the second transparent conductive layer 104. The polarizer 11 is suitable for a touch sensing type LCD screen.

The structure of the LCD module 20 is similar to the structure of LCD module 10, except that the LCD module 20 further includes a transparent base 140, and the first transparent conductive layer 102 is sandwiched between the transparent base 140 and the upper polarizing layer 114. The first transparent conductive layer 102 can be a patterned metal oxide layer formed on the transparent base 140. The patterned metal oxide layer includes a plurality of transparent conductive belts 118, and each of the plurality of the transparent conductive belts 118 is electrically connected to one of the plurality of the first electrodes 106, respectively.

A material of the transparent conductive belt 118 can be ITO or tin antimony oxide. In one embodiment, the material of the transparent conductive belt 118 is ITO. The transparent conductive belts 118 can be formed by depositing the metal oxide layer on the transparent base 140. The polarizer 11 can be formed by covering the transparent base 140, having the transparent conductive belt 118 thereon, to the upper polarizing layer 114. The polarizer 11 can be directly located on the liquid crystal module 12. Furthermore, the plurality of transparent conductive belts 118 can be parallel with and spaced from each other extending along the second direction. The plurality of transparent conductive belts 118 forms a conductive route only along the second direction. A width of the transparent conductive belt 118 and a distance between adjacent two transparent conductive belts 118 can be changed depending on the desired resolution. In one embodiment, the distance between adjacent two transparent conductive belts 118 ranges from about 10 micrometers to about 500 micrometers. The width of the transparent conductive belt 118 ranges from about 10 micrometers to about 5 millimeters.

The second transparent conductive layer 104 still includes the carbon nanotube layer, including the plurality of carbon nanotubes substantially arranged along the second direction. Furthermore, the polarization of the upper polarizing layer 114 can be parallel with the second direction. The second carbon nanotube layer in the second transparent conductive layer 104 is the free-standing structure, and the second carbon nanotube layer can be formed first and directly attached on a surface of the upper polarizing layer 114. Thus the second transparent conductive layer 104 can be easily integrated into the upper polarizing layer 114. By comparison, the traditional ITO layer need to be formed on the polarizing layer via a sputtering method or vacuum evaporation process, however surface of the polarizing layer is difficult to satisfy the requirement of the sputtering method and the vacuum evaporation process. Therefore, the traditional ITO layer is difficult to be integrated into the polarizing layer.

In another embodiment, the structures of the first and second transparent conductive layers 102, 104 can be exchanged. That is, the first transparent conductive layer 102 can be a layer having anisotropic impedance property, such as the carbon nanotube drawn film, and the second transparent conductive layer 104 includes the plurality of transparent conductive belts 118. Furthermore, the plurality of transparent conductive belts 118 of the second transparent conductive layer 104 can be directly deposited on the upper substrate 110 of the liquid crystal module 12.

Figure 7A:
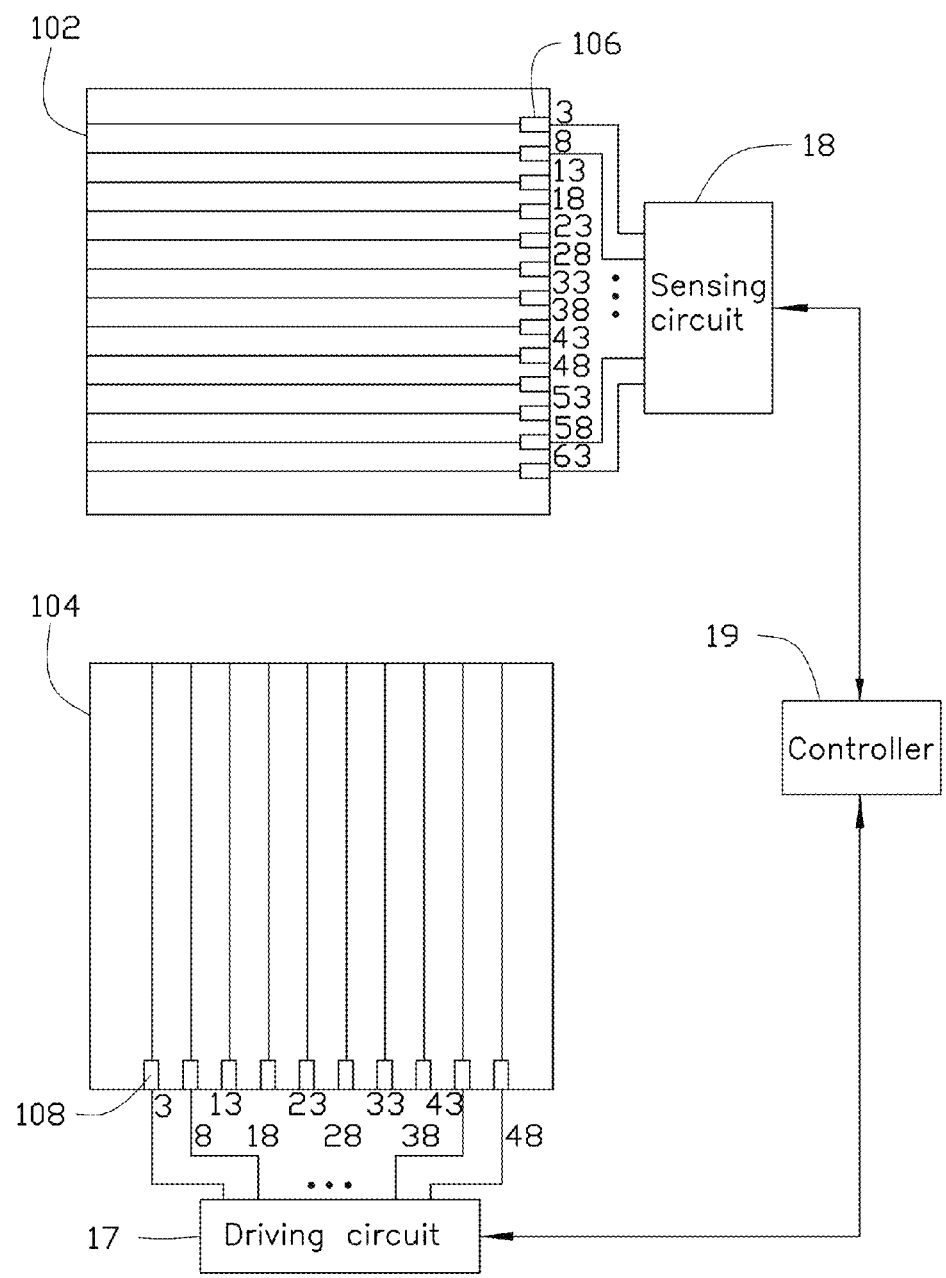
FIG. 7A shows a touch point locating system of one embodiment of the LCD module.

Referring to FIG. 7A, FIG. 7A shows a touch point locating system of the LCD module of the first embodiment of the present disclosure. Each second electrode 108 connects to an electrical signal input circuit or a driving circuit 17 via a conductive line. The driving circuit 17 inputs driving electrical signals with the same pulse waveform or other waveforms to each second electrode 108 in sequence or simultaneously. Each first electrode 106 connects to an electrical signal readout circuit or a sensing circuit 18 via a conductive line to read out sensed electrical signals of each first electrode 106. The second electrode 108 is used as the driving electronic signal pad, while the first electrode 106 is used as the sensing electronic signal pad. The driving circuit 17 and the sensing circuit 18 are controlled by a controller 19.

Figure 7B:
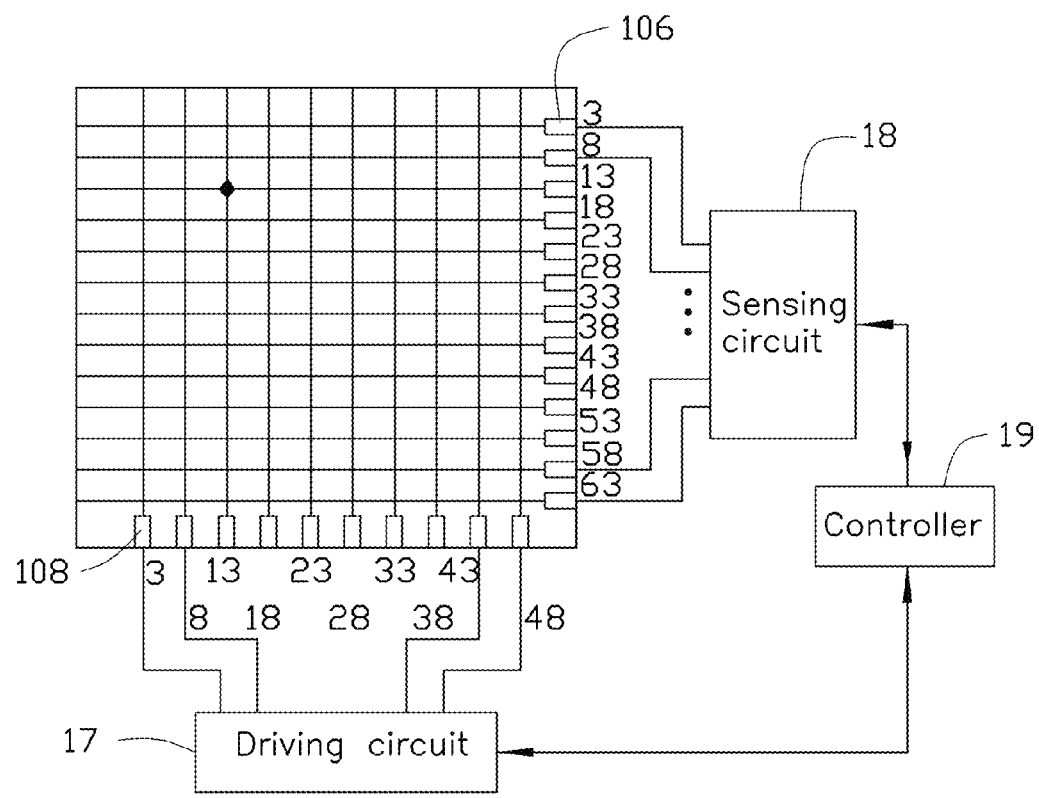
FIG. 7B shows a schematic view of a combination of a first transparent conductive layer and a second transparent conductive layer of FIG. 7A.

FIG. 7B shows a schematic view of the combination of the first transparent conductive layer 102 and the second transparent conductive layer 104. In FIG. 7A and FIG. 7B, ten second electrodes 108 are shown and designated as 3, 8, 13, 18, 23, 28, 33, 38, 43, and 48, and thirteen first electrodes 106 are shown and designated as 3, 8, 13, 18, 23, 28, 33, 38, 43, 48, 53, 58 and 63. When the stylus or the finger touches the LCD module, the capacitance value C generated by the touch gives the sensed electrical signals of the first electrodes 106 unique features, so the coordinate of the touch point such as x coordinate of x-axis and y coordinate of y-axis can be determined.

Figure 8A:
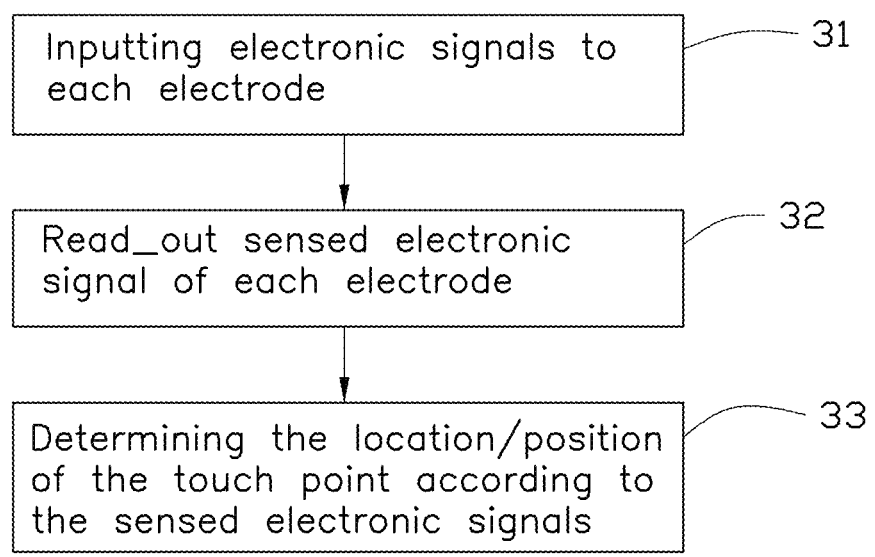
FIG. 8A shows a flowchart of a method for locating a touch point on the LCD module.

Referring to FIG. 8A, a method for locating a touch point on the liquid crystal module of one embodiment of the present disclosure includes steps of:

step 31, inputting driving electrical signals with the same pulse waveforms or other waveforms from the driving circuit 17 to each second electrode 108 in sequence or simultaneously;

step 32, reading out the sensed electronic signal of each first electrode 106 by the sensing circuit 18; and step 33, determining the location/position of the touch point by the controller 19 according to the sensed electronic signals.

For the touch point locating system of the LCD module shown in FIG. 7B, the second transparent conductive layer 104 is used as the bottom conductive film, and the first transparent conductive layer 102 is used as the top conductive film, such that the driving electronic signals are input to the bottom conductive film and the sensed electronic signals are generated from the top conductive film.

Figure 8B:
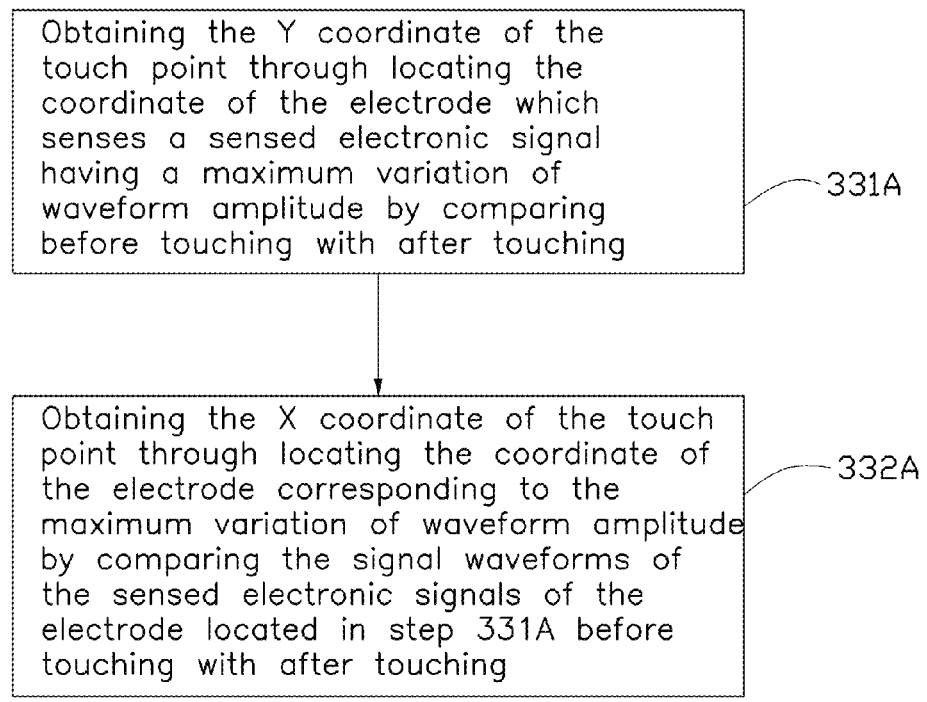
FIG. 8B shows a flowchart of a method for determining a coordinate of the touch point on the system shown in FIG. 7B.

Referring to FIG. 8B, the step 33 of determining the location/position of the touch point includes steps 331A and 332A. In step 331A, the coordinate of the touch point along y-axis is obtained through locating the coordinate or position of the first electrodes 106 (e.g., the first electrode 106 designated as "13" in FIG. 7B) sensing the electronic signal with a maximum variation of waveform amplitude by comparing before touching with during touching. In step 332A, the coordinate of the touch point along the x-axis is obtained through locating the coordinate or position of the second electrodes 108 corresponding to the maximum variation of the waveform amplitude by comparing the signal waveforms of the sensed electronic signals of the first electrodes 106 before touching with during touching.

Figure 9A:
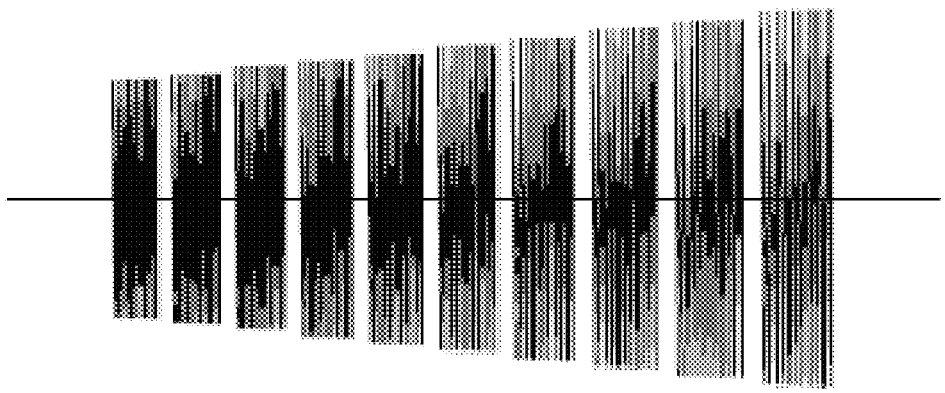
FIG. 9A shows signal waveforms of sensed electrical signals by any sensing electrode shown in FIG. 7B during touching.

When the waveform of the electronic signal received by each second electrode 108 is the pulse waveform, the waveform of the electronic signals sensed by each first electrode 106 are shown in FIG. 9A if there is only one touch point. As shown in FIG. 9A, the sections of the waveform from left to right are generated from the pulse signals input by the ten second electrodes 108 designated from "3" to "48."

Figure 9B:
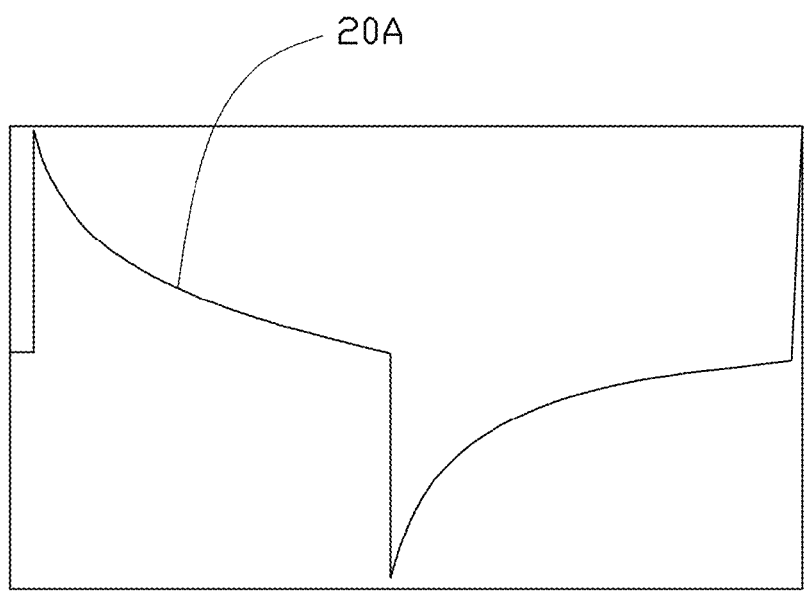
FIG. 9B shows an enlarged view of waveform of an electrical signal read out by a sensing electrode corresponding to a pulse signal input by a specific driving electrode when no touch point is present on the system shown in FIG. 7B.

Moreover, the waveform or amplitude of the sensed electronic signal resulting from the pulse signal input by the second electrodes 108 which is the closest to the first electrodes 106 designated as "48" is maximum. FIG. 9B shows an enlarged view of waveform 20A of an electronic signal sensed by the first electrodes 106 corresponding to a pulse signal input by a second electrodes 108 when no touch point is present on the touch panel.

Figure 9C:
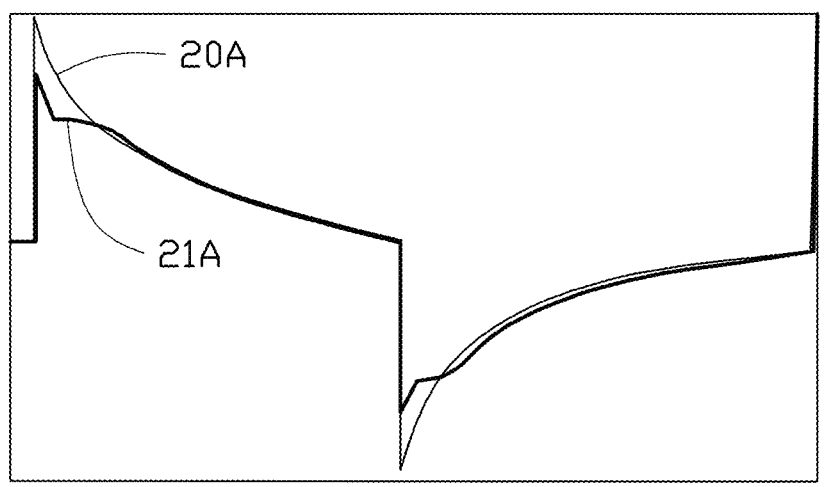
FIG. 9C shows a comparison of an enlarged view of waveform of an electrical signal read out by a sensing electrode corresponding to a pulse signal input by a specific electrode when a touch point is present on the system shown in FIG. 7B with the enlarged view of the waveform shown in FIG. 9B.

FIG. 9C shows an enlarged view of waveform 21A of an electronic signal sensed by the first electrode 106 such as the first electrode designated as "13" corresponding to a pulse signal input by a second electrode 108 when a touch point is present on the LCD module compared with the waveform in FIG. 9B. Apparently, as shown in FIG. 9C, a maximum variation between waveform 21A of the sensed electronic signal sensed by the first electrode 106 designated as "13" after touching and waveform 20A of the sensed electronic signal sensed by the same electrode before touching is present when a stylus or a finger touch the touch point on the surface of the liquid crystal module shown in FIG. 7B.

Figure 10A:
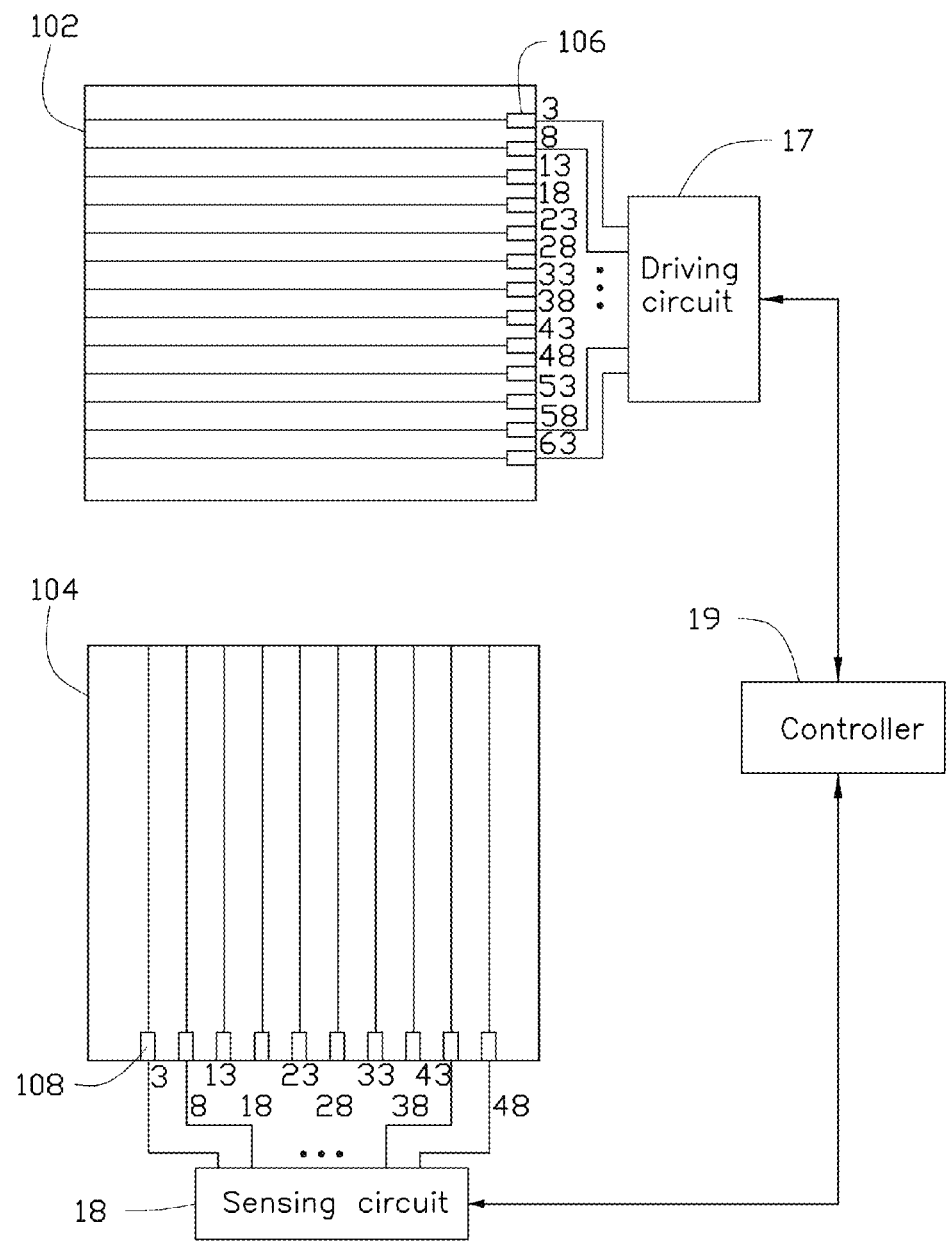
FIG. 10A shows a touch point locating system of another embodiment of the LCD module.

FIG. 10A shows a touch point locating system of the liquid crystal module of another embodiment of the present disclosure. Each first electrode 106 connects to an electronic signal input circuit or a driving circuit 17 via a conductive line. The driving circuit 17 inputs electronic signals with the same pulse waveform or other waveforms to each first electrode 106 in sequence or simultaneously. Each second electrode 108 connects to an electronic signal readout circuit or a sensing circuit 18 via a conductive line to read out sensed electronic signals of each second electrode 108. The first electrode 106 is used as the driving electronic signal pad, while the second electrode 108 is used as the sensing electronic signal pad. The driving circuit 17 and the sensing circuit 18 are controlled by a controller 19.

Figure 10B:
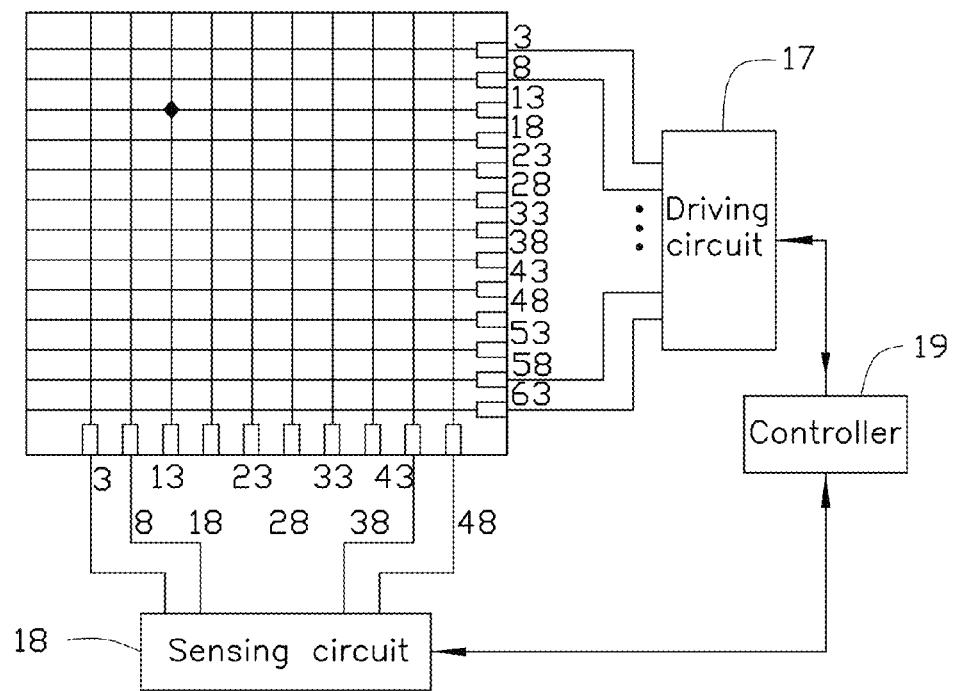
FIG. 10B shows a schematic view of a combination of a first transparent conductive layer and a second transparent conductive layer of FIG. 10A.

Referring to FIG. 10B, FIG. 10B shows a schematic view of the combination of the first transparent conductive layer 102 and the second transparent conductive layer 104. In FIG. 10A and FIG. 10B, ten second electrodes 108 are shown and designated as from "3" to "48," and thirteen first electrodes 106 are shown and designated from "3" to "63." When the stylus or the finger touches the LCD module, through the touch point locating system, the capacitance values C generate sensed electronic signals with specific features on the second electrodes 108 so as to determine the coordinate of the touch point such as x coordinate of x-axis and y coordinate of y-axis.

Figure 11:
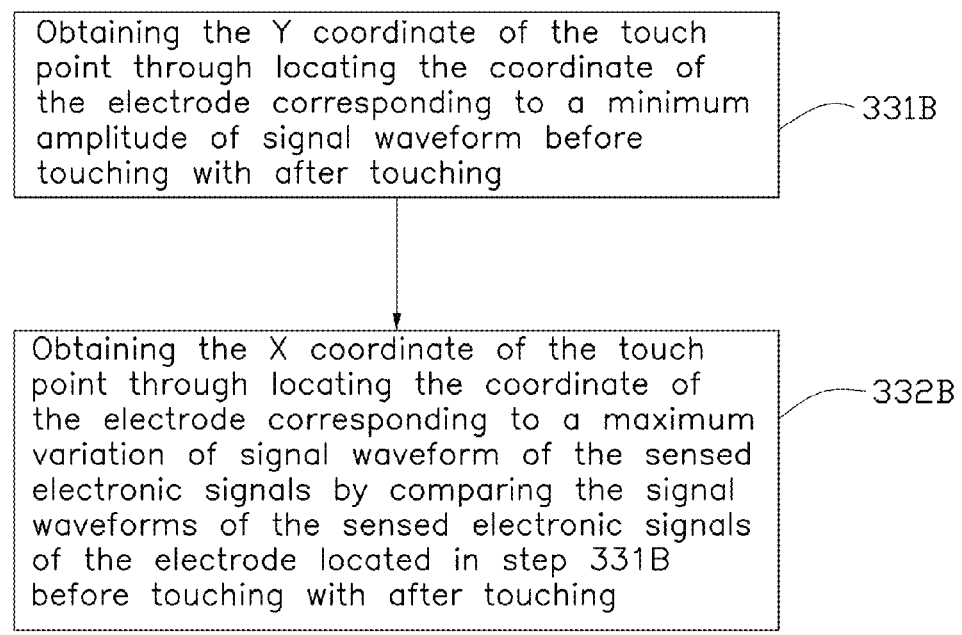
FIG. 11 shows a flowchart of a method for determining a coordinate of a touch point on the system shown in FIG. 10B.

Referring to FIG. 11, a flow chart of a method for locating a touch point on the LCD module of one embodiment of the present disclosure including steps of:

331B, obtaining the coordinate of the touch point along the second direction or y-axis or the longitudinal axis through locating the coordinate or position of the first electrode 106 corresponding to a minimum amplitude of signal waveform of the sensed electronic signals resulting from touching; and 332B, obtaining the coordinate of the touch point along the first direction or x-axis or the transverse axis.

Figure 12A:
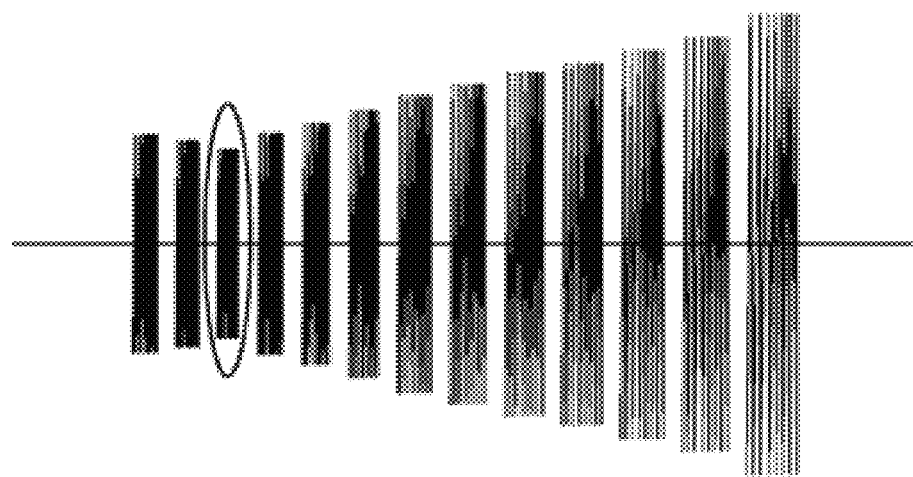
FIG. 12A shows the signal waveforms of the sensed electrical signals by any sensing electrode shown in FIG. 10B during touching.

When the waveform of the electronic signal received by each first electrode 106 is the pulse waveform, the waveform of the sensed electronic signal sensed by each second electrode 108 is shown in FIG. 12A if there is only one touch point. As shown in FIG. 12A, the sections of the waveform from left to right are generated from the pulse signals input by the thirteen first electrode 106 designated from "3" to "63."

Figure 12B:
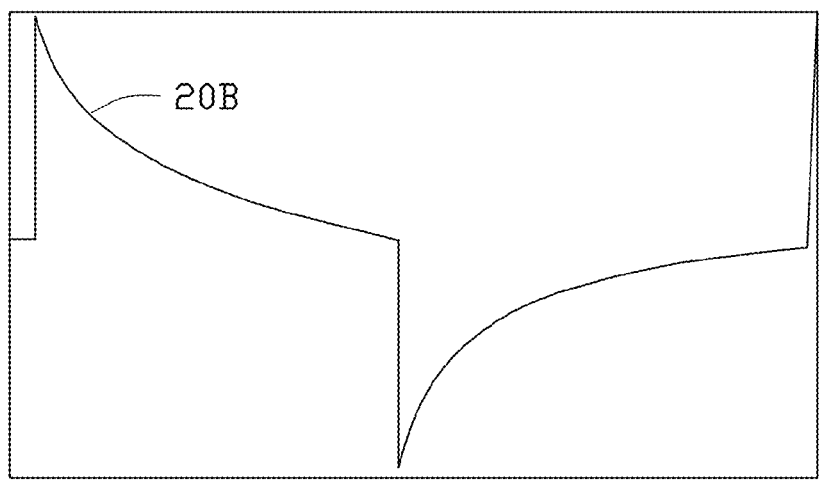
FIG. 12B shows an enlarged view of waveform of an electrical signal read out by a sensing electrode corresponding to a pulse signal input by a specific driving electrode when no touch point is present on the system shown in FIG. 10B.
Figure 12C:
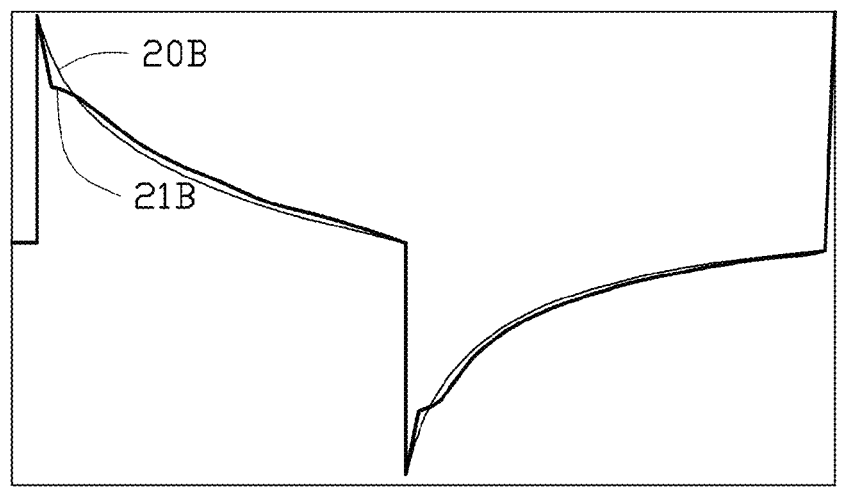
FIG. 12C shows a comparison of an enlarged view of waveform of an electronic signal read out by a sensing electrode corresponding to a pulse signal input by a specific driving electrode when a touch point is present on the system shown in FIG. 10B with the enlarged view of the waveform shown in FIG. 12B.

Moreover, in one embodiment, the waveform or amplitude of the sensed electronic signal resulting from the pulse signal input by the first electrode 106 which is the closest to the second electrode 108 designated as "63" is maximum. FIG. 12B shows an enlarged view of waveform 20B of an electronic signal sensed by the second electrode 108 corresponding to a pulse signal input by the first electrode 106 when no touch point is present on the liquid crystal module. FIG. 12C shows an enlarged view of waveform 21B of an electronic signal sensed by the second electrode 108 such as the second electrode 108 designated as "13" corresponding to a pulse signal input by the first electrode 106 when a touch point is present on the LCD module.

As shown in FIG. 12C, a maximum variation between waveform 21B of the sensed electronic signal sensed by the second electrode 108 designated as "13" during touching and the waveform 20B of the electronic signal sensed by the same electrode before touching is present when a stylus or a finger touch the touch point on the surface of the touch panel shown in FIG. 10B. However, since the variation between the waveform 21B of the electronic signal during touching and the waveform 20B of the electronic signal before touching is susceptible to RC delay and is not precise, the detection or determination of the coordinate of the touch point along the first direction or x-axis or the transverse axis can not solely rely on the variation between the waveform 21B and the waveform 20B. Referring to FIG. 12A, the coordinate of the touch point along the second direction or y-axis or the longitudinal axis is obtained through comparing the signal waveforms of the sensed electronic signals read out by the second electrodes 108 to locate the coordinate or position of the first electrode 106 designated as 13 which inputs the electronic signal causing the minimum amplitude of signal waveform.

The coordinate of the touch point along the second direction or y-axis or the longitudinal axis according to step 331B is obtained through locating the coordinate or position of the electrode corresponding to the minimum amplitude of signal waveform of the sensed electronic signals by comparing before touching with after touching. The coordinate of the touch point along the first direction or x-axis or the transverse axis according to step 332B is obtained through locating the coordinate or position of the pad such as the second electrode 108 designated as "13" corresponding to a maximum variation of signal waveform of the sensed electronic signals by comparing the signal waveforms of the sensed electronic signals before touching with after touching.

However, since the variations of waveforms of electronic signals by comparing before touching with during touching sensed by adjacent second electrodes 108 resulting from the input pulse signal by the same electrode such as the first electrode 106 designated as 13 are similar, error of the detection or determination of the coordinate of the touch point along the first direction or x-axis or the transverse axis is usually present.

Figure 13A:
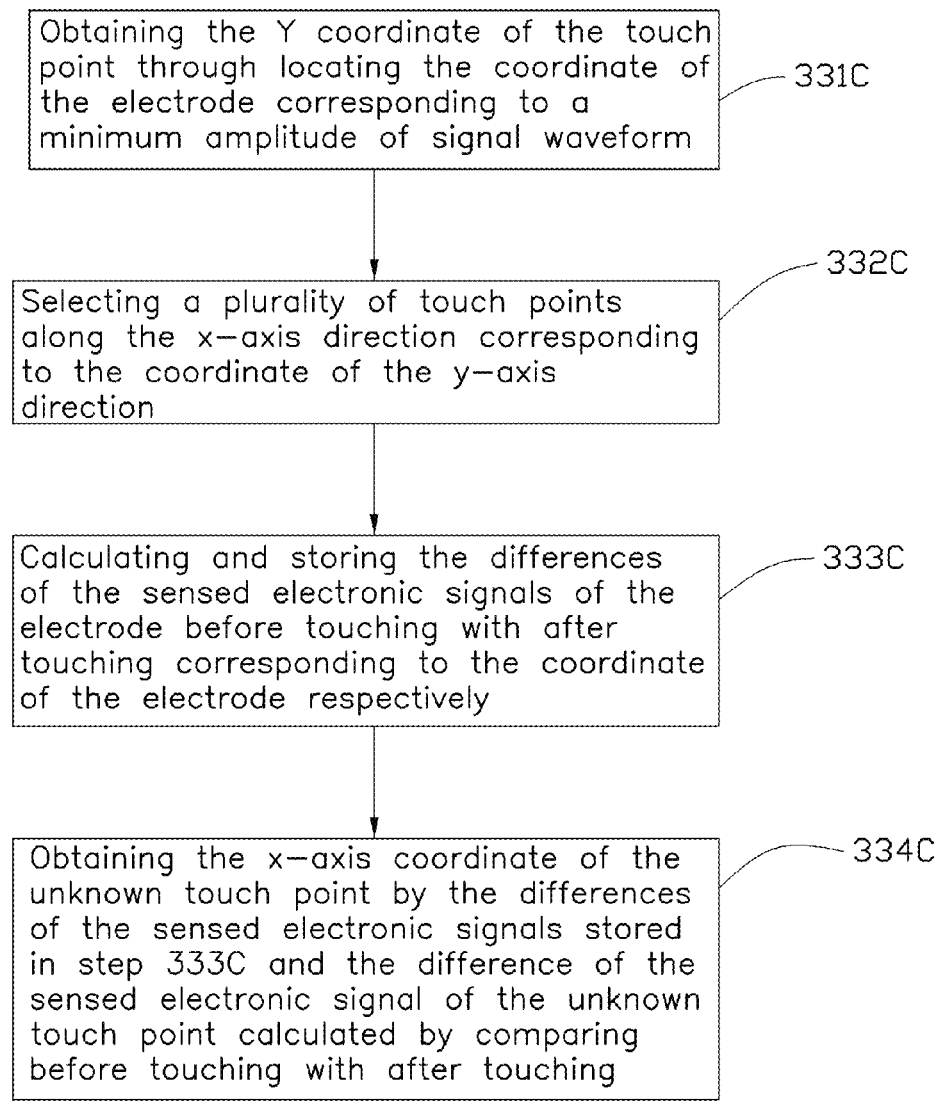
FIG. 13A shows a flowchart of another embodiment of a method for determining the coordinate of the touch point in the system shown in FIG. 10B.
Figure 13B:
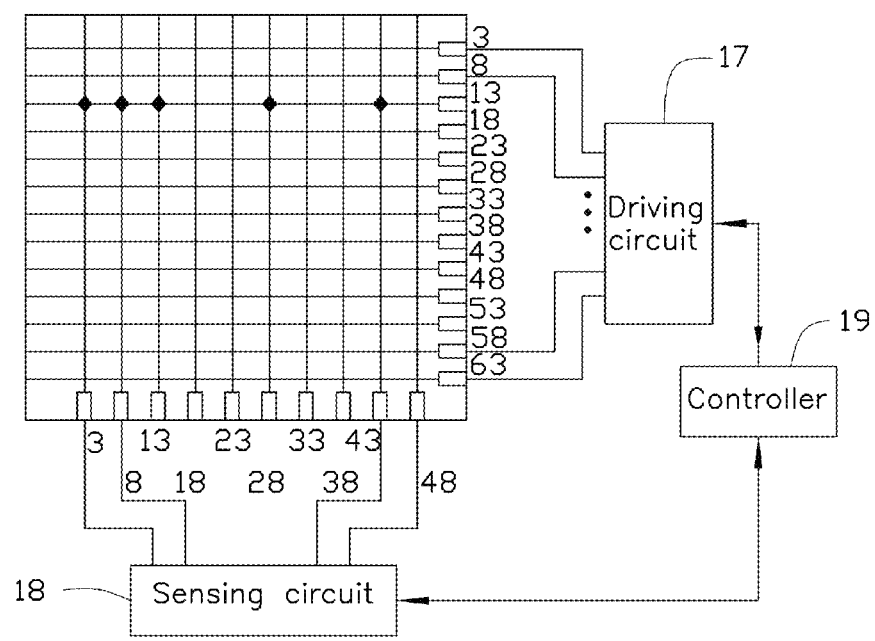
FIG. 13B shows a plurality of touch points selected along x-axis corresponding to the driving electrode designated as "13."

FIG. 13A shows another embodiment of step 33 of the method for locating a touch point on the touch panel. In this embodiment, the step 331C of determining the coordinate of the touch point along the second direction or y-axis or the longitudinal axis is similar to the step 331B. The coordinate of the touch point along the second direction or y-axis or the longitudinal axis is obtained through locating the coordinate or position of the pad such as the first electrode 106 designated as "13." Then in step 332C, a plurality of points is selected along the first direction or x-axis or the transverse axis corresponding to the coordinate of the second direction or y-axis or the longitudinal axis. As shown in FIG. 13B, the x-axis coordinates of these points are the x-axis coordinates of the second electrodes 108 designated as 3, 8, 13, 28 and 43. Next, in step 333C, the differences of the sensed electronic signals of the second electrodes 108 of the points before touching with during touching corresponding to the coordinate of the first electrode 106 respectively are calculated and stored, and the unit of the differences of the sensed electronic signals is millivolt. In step 334C, the x-axis coordinate of the unknown touch point is obtained by the differences of the sensed electronic signals stored in step 333C and the difference of the sensed electronic signal of the unknown touch point calculated by comparing before touching with after touching.

A transparent protective film (not shown) can be further located on the upper surface of the first transparent conductive layer 102. The material of the transparent protective film can be silicon nitride, silicon dioxide, BCB, polyester, acrylic resin, PET, or any combination thereof. The transparent protective film can also be a plastic film treated with surface hardening treatment. The transparent protective film can reduce glare or reflection. In one embodiment, the material of the transparent protective film is PET.

As described above, the LCD module shares the upper polarizing layer with the above described polarizer. Thus, the LCD module 20 can be thin, simply structured, and low cost.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A liquid crystal display (LCD) module comprising:
a liquid crystal module comprising an upper substrate, an upper electrode layer, a first alignment layer, a liquid crystal layer, a second alignment layer, a thin film transistor panel, and a lower polarizing layer stacked in that order; and
a polarizer located on the upper substrate, having touch sensing capability, the polarizer comprising:
an upper polarizing layer located on the upper substrate, having a first surface and a second surface opposite to the first surface, wherein the second surface is adjacent to the upper substrate;
a first transparent conductive layer located on the first surface of the upper polarizing layer, the first transparent conductive layer comprising a plurality of transparent conductive belts spaced from each other and extending along a second direction;
a second transparent conductive layer located on the second surface of the upper polarizing layer, the second transparent conductive layer being an anisotropic impedance layer having a relatively low impedance direction along a first direction;
a plurality of first electrodes being spaced from each other and arranged in a row along the first direction and electrically connected with the first transparent conductive layer; and
a plurality of second electrodes being spaced with each other and arranged in a row along the second direction and electrically connected with the second transparent conductive layer.

2. The LCD module of claim 1, wherein a first polarizing direction of the upper polarizing layer is parallel with the first direction.

3. The LCD module of claim 2, wherein a second polarizing direction of the lower polarizing layer is perpendicular with the first polarizing direction.

4. The LCD module of claim 1, wherein the first direction is substantially perpendicular to the second direction.

5. The LCD module of claim 1, wherein the second transparent conductive layer comprises a carbon nanotube film.

6. The LCD module of claim 5, wherein the carbon nanotube film is a free-standing structure.

7. The LCD module of claim 5, wherein the carbon nanotube film comprises a plurality of carbon nanotubes substantially aligned along the first direction.

8. The LCD module of claim 7, wherein an end of one carbon nanotube is joined to another end of an adjacent carbon nanotube arranged substantially along the first direction by Van der Waals attractive force in the carbon nanotube film.

9. The LCD module of claim 7, wherein the plurality of carbon nanotubes is aligned parallel with the second surface of the upper polarizing layer.

10. The LCD module of claim 1, wherein the second transparent conductive layer comprises a plurality of carbon nanotube films stacked with each other.

11. The LCD module of claim 1, wherein the second transparent conductive layer is a carbon nanotube composite film comprising a carbon nanotube film and polymer materials infiltrating the carbon nanotube film.

12. The LCD module of claim 1, wherein the first transparent conductive layer and the second transparent conductive layer is insulated by the upper polarizing layer.

13. A LCD module comprising:
an polarizer, an upper substrate, an upper electrode layer, a first alignment layer, a liquid crystal layer, a second alignment layer, a thin film transistor panel, and a lower polarizing layer stacked in that order, wherein the polarizer comprises:
an upper polarizing layer located on the upper substrate, having a first surface and a second surface opposite to the first surface, wherein the second surface is adjacent to the upper substrate;
a first transparent conductive layer located on the first surface of the upper polarizing layer, the first transparent conductive layer is an anisotropic impedance layer having a relatively low impedance direction along a second direction;
a plurality of first electrodes being spaced with each other and arranged in a row along a first direction and electrically connected with the first transparent conductive layer;
a second transparent conductive layer located on the second surface of the upper polarizing layer, the first transparent conductive layer comprises a plurality of transparent conductive belts spaced from each other, aligned along the second direction, and extending along the first direction; and
a plurality of second electrodes being spaced with each other and arranged in a row along a second direction and electrically connected with the plurality of transparent conductive belts.

* * * * *